United States Patent [19]
Oba et al.

[11] Patent Number: 5,897,960
[45] Date of Patent: *Apr. 27, 1999

[54] LAMINATE AND PRODUCTION PROCESS THEREOF

[75] Inventors: Hiroyuki Oba; Hideaki Tanaka; Tomoaki Sato; Tomohisa Hasegawa, all of Ibaraki-ken, Japan

[73] Assignee: Kureha Kagaku Kogyo K.K., Tokyo, Japan

[*] Notice: This patent is subject to a terminal disclaimer.

[21] Appl. No.: 08/813,394

[22] Filed: Mar. 10, 1997

Related U.S. Application Data

[63] Continuation of application No. 08/378,216, Jan. 25, 1995, abandoned.

[30] Foreign Application Priority Data

Jan. 26, 1994 [JP] Japan .................................. 6-023736
Dec. 19, 1994 [JP] Japan .................................. 6-334405

[51] Int. Cl.$^6$ .................................................. B32B 23/08
[52] U.S. Cl. .................. 428/532; 428/35.4; 428/36.6; 428/36.7; 428/500; 428/507; 428/508; 428/509; 428/515; 428/518; 524/27; 524/47; 524/52; 524/56; 524/58; 525/54.2; 525/54.26; 427/372.2; 427/374.1; 427/384; 427/393.5
[58] Field of Search .................... 428/36.7, 36.6, 428/35.4, 500, 515, 518, 532, 507, 508, 509; 524/47, 52, 56, 58; 525/54.2, 54.26; 427/372.2, 374.1, 384, 393.5

[56] References Cited

U.S. PATENT DOCUMENTS

| | | | |
|---|---|---|---|
| 2,169,250 | 8/1939 | Izard . | |
| 4,529,654 | 7/1985 | Drum | 428/340 |
| 4,919,984 | 4/1990 | Maruhashi et al. | 428/36.4 |
| 5,153,038 | 10/1992 | Koyama et al. | 428/35.8 |
| 5,498,662 | 3/1996 | Tanaka et al. | 525/54.2 |

FOREIGN PATENT DOCUMENTS

| | | |
|---|---|---|
| 121179 | 3/1984 | European Pat. Off. . |
| 409788 | 7/1990 | European Pat. Off. . |
| 4-90339 | 3/1992 | Japan . |
| 4-100913 | 4/1992 | Japan . |
| 4-114044 | 4/1992 | Japan . |
| 4-144043 | 4/1992 | Japan . |
| 4-132748 | 5/1992 | Japan . |
| 5-92507 | 4/1993 | Japan . |
| 5-93092 | 4/1993 | Japan . |
| 1456629 | 6/1974 | United Kingdom . |
| 2187674 | 1/1987 | United Kingdom . |

OTHER PUBLICATIONS

Derwent Abstract, EP0 121 179.
Testing Methods for Transition Temperatures of Plastics, Japanese Industrial Standard, JIS K 7121, 1987.
Testing Methods for Vicat Softening Temperature of Thermoplastics, Japanese Industrial Standard, JIS K 7206, 1991.

*Primary Examiner*—Mark L. Warzel
*Attorney, Agent, or Firm*—McDermott, Will & Emery

[57] ABSTRACT

A laminate having a laminated structure of at least two layers includes a gas barrier film (A) formed from a mixture containing at least one poly(meth)acrylic acid polymer selected from the group consisting of poly(meth)acrylic acid and partially neutralized products thereof and a saccharide in a weight ratio of 95:5 to 20:80, and having an oxygen permeability constant of $5.00 \times 10^{-3}$ ml(STP)·cm/m$^2$·h·atm{Pa} or smaller as measured under conditions of 30° C. and 80% relative humidity, and a layer (B) formed from a thermoplastic resin. The film (A) and the layer (B) are laminated contiguously to each other. A process for the production of a laminate having a laminated structure of at least two layers comprises a step of forming a gas barrier film (A) having an oxygen permeability constant of $5.00 \times 10^{-3}$ ml(STP)·cm/m$^2$·h·atm{Pa} or smaller as measured under conditions of 30° C. and 80% RH, wherein a solution containing at least one poly(meth)acrylic acid polymer selected from the group consisting of poly(meth)acrylic acid and partially neutralized products thereof and a saccharide in a weight ratio of 95:5 to 20:80 is coated on a layer (B) formed from a thermoplastic resin, the solution coated is dried to form a film, and the film is then subjected to a heat treatment at a temperature of at least 100° C. (373K). The film (A) and the layer (B) are contiguous to each other.

28 Claims, 1 Drawing Sheet

LAMINATE AND PRODUCTION PROCESS THEREOF

This application is a continuation of application Ser. No. 08/378,216 filed Jan. 25, 1995 now abandoned.

FIELD OF THE INVENTION

The present invention relates to laminates excellent in gas barrier property and a production process thereof, and more particularly to multi-layer laminates comprising, as a gas barrier layer, a film which is formed from a mixture containing poly(meth)acrylic acid and/or a partially neutralized product thereof and a saccharide, and excellent in water resistance and gas barrier property, and a production process thereof.

The laminates according to the present invention are suitable for use as packaging materials for food containing a great amount of water and/or oil, which is susceptible to deterioration in quality with oxygen, such as oxidation, and the like because the gas barrier layer is excellent in water resistance (insolubility in water and boiling water) and oxygen gas barrier property, and heat resistance, moisture resistance, mechanical strength, sealing property and the like are imparted by one or more other layers.

BACKGROUND OF THE INVENTION

In general, a function of preventing deterioration in the quality of contents is required of packaging materials. Particularly, in a field of food packaging materials and the like, in which contents are susceptible to deterioration by oxidation, the packaging materials are required to have excellent oxygen gas barrier property.

At present, for example, polyvinyl alcohol (PVA) films, films formed of a partially saponified product (EVOH) of an ethylene-vinyl acetate copolymer, polyvinylidene chloride (PVDC) films and the like are commonly used as films excellent in oxygen gas barrier property in the field of the packaging materials. Of these, the PVDC films have a feature that their gas barrier property scarcely depends on humidity unlike the PVA films and EVOH films. However, when they are incinerated, chlorine gas is generated, and so they involve an environmental problem. On the other hand, the PVA films are best in oxygen gas barrier property among general synthetic resin films in a dry state. However, they involve a drawback that their oxygen gas barrier property is impaired to a great extent due to moisture absorption under high-humidity conditions, and moreover they are soluble in boiling water.

Poly(meth)acrylic acid or partially neutralized products thereof are water-soluble polymers and may be formed into films from their solutions by a casting process. The films formed of poly(meth)acrylic acid are excellent in oxygen gas barrier property under dry conditions. However, these films show strong hydrophilic nature, and are hence markedly impaired in oxygen gas barrier property under high-humidity conditions, and moreover easy to dissolve in water.

In U.S. Pat. No. 2,169,250, it is described to polymerize a methacrylic acid monomer in an aqueous solution of PVA, cast the resulting reaction mixture of polymethacrylic acid and PVA on a glass plate, evaporate the water, and then heat the dry film for 5 minutes at 140° C., thereby reacting PVA with polymethacrylic acid to obtain a water-insoluble film (Example I). According to such heat-treating conditions, the resulting film can be made insoluble in water. However, any film exhibiting excellent oxygen gas barrier property under high-humidity conditions cannot be obtained by such heat-treating conditions.

On the other hand, starch is a hydrophilic polymer like the poly(meth)acrylic acid. Those having excellent water solubility can easily be formed into films from aqueous solutions thereof by a casting process. Films formed of starch are excellent in oil resistance and oxygen gas barrier property, but have drawbacks that they show strong hydrophilic nature, and are hence markedly impaired in oxygen gas barrier property under high-humidity conditions, and moreover are poor in mechanical strength and water resistance.

Some proposals have recently been made for producing films or sheets from mixtures of starch and various thermoplastic resins (for example, Japanese Patent Application Laid-Open Nos. 90339/1992, 100913/1992, 114044/1992, 114043/1992, 132748/1992, 93092/1993 and 92507/1993). However, these films are still insufficient in water resistance or oxygen gas barrier property under high-humidity conditions.

The present inventors repeatedly carried out an investigation with a view toward producing a film excellent in water resistance and oxygen gas barrier property under high-humidity conditions. As a result, it was found that when a film is formed from a mixture of poly(meth)acrylic acid and/or a partially neutralized product thereof and a saccharide such as starch, and the resulting film is subjected to a heat treatment under specific conditions, a film exhibiting remarkably improved oxygen gas barrier property even under high-humidity conditions, to say nothing of dry conditions, compared with films separately formed from the individual components can be obtained (U.S. patent application Ser. No. 08/324,541, now U.S. Pat. No. 5,498,662). However, the simple film thus obtained is insufficient in sealing property, mechanical strength, moisture resistance, etc., which are required of packaging materials. There has thus been a demand for a further improvement.

OBJECTS AND SUMMARY OF THE INVENTION

It is an object of the present invention to provide a multi-layer laminate comprising, as a gas barrier layer, a film high in water resistance and excellent in oxygen gas barrier property under high-humidity conditions.

More specifically, the object of the present invention is to provide a multi-layer laminate comprising, as a gas barrier layer, a film which is formed from a mixture of poly(meth) acrylic acid and/or a partially neutralized product thereof and a saccharide such as starch, high in water resistance and excellent in oxygen gas barrier property.

The present inventors have carried out an extensive investigation with a view toward achieving the above object. As a result, it has been found that a laminate having a laminated structure of at least two layers, which comprises, as a gas barrier layer, a film formed from a mixture of poly(meth)acrylic acid and/or a partially neutralized product thereof and a saccharide and subjected to a heat treatment under specific conditions, said film having high water resistance and excellent oxygen gas barrier property, and is provided with a layer formed from a thermoplastic resin contiguously to the gas barrier layer, is fit for the above object.

The present invention has been led to completion on the basis of this finding.

According to the present invention, there is thus provided a laminate having a laminated structure of at least two layers, which comprises a gas barrier film (A) formed from a mixture containing at least one poly(meth)acrylic acid polymer selected from the group consisting of poly(meth)

acrylic acid and partially neutralized products of poly(meth) acrylic acid and a saccharide in a weight ratio ranging from 95:5 to 20:80, and having an oxygen permeability constant of $5.00 \times 10^{-3}$ ml(STP)·cm/m$^2$·h·atm{Pa} or smaller as measured under conditions of 30° C. and 80% relative humidity, and a layer (B) formed from a thermoplastic resin, said film (A) and layer (B) being laminated contiguously to each other.

According to the present invention, there is also provided a process for the production of a laminate having a laminated structure of at least two layers, which comprises a step of forming a gas barrier film (A) having an oxygen permeability constant of $5.00 \times 10^{-3}$ ml(STP)·cm/m$^2$·h·atm{Pa} or smaller as measured under conditions of 30° C. and 80% relative humidity, wherein a solution containing at least one poly(meth)acrylic acid polymer selected from the group consisting of poly(meth)acrylic acid and partially neutralized products of poly(meth)acrylic acid and a saccharide in a weight ratio ranging from 95:5 to 20:80 is coated on a layer (B) formed from a thermoplastic resin, the solution coated is dried to form a film, and the film is then subjected to a heat treatment at a temperature of at least 100° C. (373 K), said film (A) and layer.(B) being contiguous to each other.

DETAILED DESCRIPTION OF THE INVENTION

Figure 1:
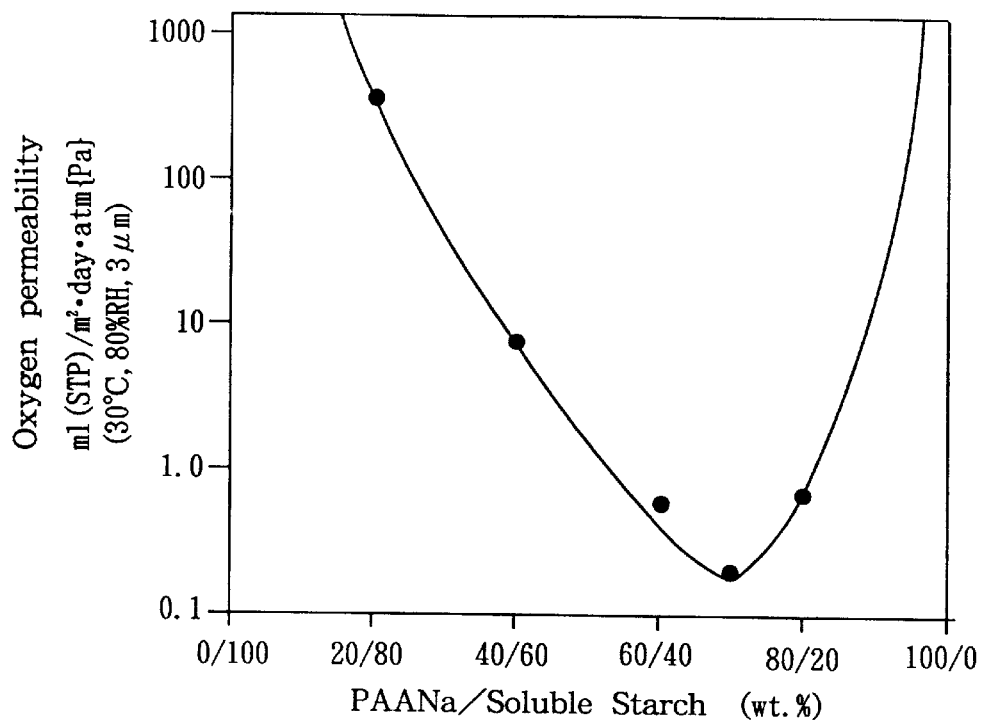
FIG. 1 is a graph showing a relationship between the weight ratio of a partially neutralized product of polyacrylic acid (PAA) to soluble starch and oxygen permeability as to heat-treated films obtained with the mixing ratio of the partially neutralized product of PAA to the soluble starch varied.

The present invention will hereinafter be described in detail.

Gas Barrier Film

In the present invention, a gas barrier film formed from a mixture containing the poly(meth)acrylic acid polymer and the saccharide in a weight ratio ranging from 95:5 to 20:80, and having an oxygen (oxygen gas) permeability constant of $5.00 \times 10^{-3}$ ml(STP)·cm/m$^2$·h·atm{Pa} or smaller as measured under conditions of 30° C. and 80% relative humidity (80% RH) is used as a gas barrier layer of the laminate.

The poly(meth)acrylic acid useful in the practice of the present invention is a compound having at least two carboxylic groups in its molecule. Specific examples thereof include polyacrylic acid, polymethacrylic acid, copolymers of acrylic acid and methacrylic acid, and mixtures of at least two polymers thereof. As preferable examples thereof, may be mentioned homopolymers of acrylic acid or methacrylic acid, and copolymers thereof. The number average molecular weight of the poly(meth)acrylic acid preferably falls within a range of from 2,000 to 250,000.

The partially neutralized product of the poly(meth)acrylic acid can be obtained by partially neutralizing the carboxyl groups of the poly(meth)acrylic acid with an alkali (namely, forming a carboxylate). As examples of the alkali, may be mentioned alkali metal hydroxides such as sodium hydroxide, lithium hydroxide and potassium hydroxide, ammonium hydroxide, etc. The partially neutralized product can be generally obtained by adding the alkali to an aqueous solution of the poly(meth)acrylic acid. This partially neutralized product is provided as an alkali metal salt, ammonium salt or the like.

The desired degree of neutralization can be achieved by controlling the quantitative ratio of the poly(meth)acrylic acid to the alkali. The degree of neutralization of the partially neutralized product of the poly(meth)acrylic acid is preferably selected on the basis of the degree of oxygen gas barrier property of the resulting film. When the degree of neutralization is 0–20%, a film excellent in gas barrier property can be obtained by suitably selecting the heat-treating conditions and the mixing ratio between both components. In the case where the degree of neutralization exceeds 20%, however, the oxygen gas barrier property shows a tendency to deteriorate. It is therefore desirable that the degree of neutralization of the partially neutralized product of the poly(meth)acrylic acid be generally not higher than 20%, preferably not higher than 15%, more preferably 5–15% from the viewpoint of the improvement in gas barrier property.

Incidentally, the degree of neutralization can be determined by the following equation:

$$\text{Degree of neutralization} = (X/Y) \times 100 \quad [\%]$$

wherein X means the number of moles of carboxyl groups neutralized in 1 g of the partially neutralized poly(meth) acrylic acid, and Y denotes the number of moles of carboxyl groups in 1 g of the poly(meth)acrylic acid before the partial neutralization.

Saccharide

In the present invention, monosaccharides, oligosaccharides and polysaccharides are used as the saccharide (also referred to as carbohydrate). Sugar alcohols and various substitution products and derivatives of the saccharides are also included in these saccharides. These saccharides are preferably soluble in water.

<Monosaccharide>

Monosaccharides are basic substances of saccharides, which are not decomposable into simpler molecules by hydrolysis, and serve as constitutive units of oligosaccharides and polysaccharides. The monosaccharides are generally represented by the general formula, $C_n H_{2n} O_n$. Of these, the monosaccharides in which the number of carbon atoms (n) is 2, 3, 4, 5, 6, 7, 8, 9 or 10 are referred to as diose, triose, tetrose, pentose, hexose, heptose, octose, nonose and decose, respectively.

The monosaccharides are classified into aldoses having an aldehyde group and ketoses having a ketone group. Those in which n is 3 or more have at least one asymmetric carbon atom. Therefore, many stereoisomers may exist according to the number of asymmetric carbon atoms. However, only part of the stereoisomers are known in nature. Many of the monosaccharides existing in nature are pentose and hexose.

As the monosaccharide used in the present invention, aldoses which are aldehydes of a chain polyhydric alcohol of n=5 or more are preferred because they exist naturally in plenty. Examples of such monosaccharides include glucose, mannose, galactose and xylose. Of these, glucose and galactose are more preferred. These monosaccharides may be used either singly or in any combination thereof.

<Sugar alcohol>

Sugar alcohols are polyhydroxyalkanes obtained by reducing aldoses or ketoses.

As the sugar alcohol used in the present invention, chain polyhydric alcohols are preferred. Such sugar alcohols may be represented by the general formula, $C_nH_{2n+1}O_n$. The sugar alcohols in which n is 3, 4, 5, 6, 7, 8, 9 or 10 are referred to as tritol, tetritol, pentitol, hexitol, heptitol, octitol, nonitol and decitol, respectively. In the individual sugar alcohols, many stereoisomers exist according to the number of asymmetric carbon atoms.

In the present invention, the sugar alcohols of n=3–6 may preferably be used. As specific examples of the sugar alcohols, may be mentioned sorbitol, mannitol, dulcitol, xylitol, erythritol and glycerol. The sugar alcohols may be use either singly or in any combination thereof.

<Oligosaccharide>

Compounds having a structure that 2 to about 10 monosaccharide units have been linked by glycosidic bonds are referred to as oligosaccharides. The oligosaccharides are classified into disaccharides, trisaccharides, tetrasaccharides, pentasaccharides and the like according to the number of monosaccharide units linked. As specific examples thereof, may be mentioned sucrose, lactose, trehalose, cellobiose, maltose, raffinose and stachyose. Those (terminal-alcoholized oligosaccharides, for example, maltitol) obtained by alcoholizing these oligosaccharides at their terminals may also be used.

<Polysaccharide>

Polysaccharide is a generic name for high molecular compounds (polymerization degree: 10 or higher) obtained by polyglycosylation of monosaccharides. Of these, a polymer composed of monosaccharide units of one kind is referred to as a homopolysaccharide (homoglycan), while a polymer composed of monosaccharide units of two or more kinds is referred to as a heteropolysaccharide (hetroglycan). The polysaccharides widely exist as reserve polysaccharides (starch and the like), structural polysaccharides (cellulose and the like) and functional polysaccharides (heparin and the like) in the animal, plant and microorganism kingdoms.

Natural polysaccharides are high molecular compounds principally containing, as constitutive units, aldohexose and aldopentose which have been linked in a linear, branched or cyclic structure by glycosidic bonds. Each of aldopentose and aldohexose forms a 6-membered ring structure called a pyranose ring by intramolecular hemiacetal linking between the aldehyde group at the $C_1$ position and the hydroxyl group at the $C_5$ position. Aldohexose and aldopentose in a molecule of the natural polysaccharides principally have this pyranose ring structure.

Aldohexose and aldopentose which are constitutive units of the natural polysaccharides include, in addition to neutral monosaccharides, the sulfuric esters, phosphoric esters and other organic acid esters of the neutral monosaccharides, methyl ethers of the neutral monosaccharides, uronic acids in which only the primary hydroxyl group in a monosaccharide has been oxidized into a carboxyl group, hexosamine in which the hydroxyl group at the $C_2$ position in aldohexose has been substituted by an amino group, and N-acetylhexosamine as its derivative, and 3,6-etherified aldohexose obtained by dehydration reaction between the hydroxyl groups at the $C_3$ and $C_6$ positions.

The natural polysaccharides are widely distributed in the animal and plant kingdoms, and exist in plants as components which are or are not involved in the constitution of cell walls of higher plants and seaweeds, and constitutive components for cells of microorganisms. The natural polysaccharides which are not involved in the constitution of the cell walls of higher plants and seaweeds include mucilage contained in cell sap and reserve substances such as starch. In the animal kingdom, they exist as reserve substances such as glycogen and constitutive components for mucus such as heparin and chondroitin sulfate.

The natural polysaccharides are classified into neutral polysaccharides, acid polysaccharides and basic polysaccharides according to their constitutive components. The neutral polysaccharides include mannan and glucan as homopolysaccharides. Besides, as heteropolysaccharides, those composed of only hexose are contained in konjak and guaran, while those composed of only pentose are contained in xylan and araboxylan. On the other hand, those containing both hexose and pentose are known to be contained in tamarind. With respect to the acid polysaccharides, those containing uronic acid only, or galacturonic acid and neutral monosaccharides, and those containing glucuronic acid and neutral monosaccharides include *Hibiscus manihot* and pectin, and chamomile and *Asparacrus cochinchinensis*, respectively. Besides, there are acid polysaccharides containing the sulfuric esters, phosphoric esters, other organic acid esters or methyl ethers of neutral monosaccharides, or the 3,6-etherified aldohexose. Basic polysaccharides include those containing glucosamine or galactosamine as a constitutive component.

The polysaccharides used in the present invention include, in addition to these natural polysaccharides, those obtained by hydrolyzing these polysaccharides in a solid or liquid phase, or a solid-liquid mixed phase using, as a catalyst, an organic acid, an inorganic acid, or a hydrolase for the individual polysaccharides, if necessary, under heat, and those obtained by further modifying the natural polysaccharides and the hydrolyzates thereof as described above.

Exemplary modifications of the natural polysaccharides and the hydrolyzates thereof include:

(1) esterification with an inorganic or organic acid, or etherification such as allyl etherification, methyl etherification or carboxymethyl etherification;

(2) cationizing treatment: for example, a reaction of the natural polysaccharide or a hydrolyzate thereof with 2-diethylaminoethyl chloride or 2,3-epoxypropyltrimethylammonium chloride;

(3) crosslinking treatment: for example, crosslinking making use of formaldehyde, epichlorohydrin, phosphoric acid or acrolein; and (4) grafting treatment: for example, graft polymerization of the natural polysaccharide or a hydrolyzate thereof with various kinds of monomers. Examples of the monomers include vinyl acetate, vinyl propionate, t-butyl vinyl ether, (meth)acrylamide, (meth)acrylic acid, alkyl (meth)acrylates, hydroxyalkyl (meth) acrylates, ethoxyalkyl (meth)acrylates, methoxypolyethylene glycol (meth)acrylates, 2-hydroxy-3-chloropropyl (meth)acrylate, dimethylaminoethyl (meth)acrylate, glycidyl methacrylate, acrylonitrile, styrene, maleic anhydride and itaconic acid.

Among these natural polysaccharides and hydrolyzates thereof, and modified products thereof, those soluble in water are preferred. Of the water-soluble natural polysaccharides and hydrolyzates thereof, and modified products thereof, homopolysaccharides comprising, as a constitutive component, glucose are more preferred. Examples of the homopolysaccharides composed of glucose include starch, cellulose, dextran, pullulan, water-soluble chitin and chitosan.

In the present invention, their corresponding sugar alcohols may be used in place of the natural polysaccharides and hydrolyzates thereof, and modified products thereof. In this specification, the sugar alcohols of the natural polysaccharides and hydrolyzates thereof, and modified products thereof mean those in which the carbonyl group at the $C_1$ position of a reducible terminal in each polymer has been reduced into an alcohol. Besides, saccharides such as cyclodextrin, in which molecular chains of monosaccharides are cyclically linked, may also be used in the present invention. The polysaccharides used in this invention may be used either singly or in any combination thereof.

<Starch>

Starch is included in the above-described polysaccharides. However, the starch used in the present invention will hereinafter be described in more detail.

The starch used in the present invention includes crude starch (unmodified starch) such as wheat starch, corn starch, waxy corn starch, potato starch, tapioca starch, rice starch, sweet potato starch and sago, and besides various kinds of modified starch.

Examples of the modified starch include (1) physically modified starch such as α-starch, separated and purified amylose, separated and purified amylopectin, and wet-heat treated starch, (2) enzyme-modified starch such as hydrolyzed dextrin, enzymolyzed dextrin and amylose, (3) chemically decomposed and modified starch such as acid-treated starch, hypochlorous acid-oxidized starch and starch dialdehyde, (4) chemically modified starch such as esterified starch (starch acetate, starch succinate, starch nitrate, starch phosphate, starch urea phosphate, starch xanthate, starch acetoacetate, etc.), etherified starch (starch allyl ether, starch methyl ether, starch carboxymethyl ether, starch hydroxyethyl ether, starch hydroxypropyl ether, etc.), cationic starch (a reaction product of starch with 2-diethylaminoethyl chloride, a reaction product of starch with 2,3-epoxypropyltrimethylammonium chloride, etc.), and crosslinked starch (formaldehyde-crosslinked starch, epichlorohydrin-crosslinked starch, phosphoric acid-crosslinked starch, acrolein-crosslinked starch, etc.), and (5) graft-modified starch obtained by graft-polymerizing a monomer on various kinds of starch [exemplary monomers include vinyl acetate, vinyl propionate, t-butyl vinyl ether, (meth)acrylamide, (meth)acrylic acid, alkyl (meth)acrylates, hydroxyalkyl (meth)acrylates, ethoxyalkyl (meth)acrylates, methoxypolyethylene glycol (meth)acrylates, 2-hydroxy-3-chloropropyl (meth)acrylate, dimethylaminoethyl (meth)acrylate, glycidyl methacrylate, acrylonitrile, styrene, maleic anhydride and itaconic acid].

Of these kinds of starch, modified starch soluble in water is preferred. The starch may contain water. These kinds of starch may be used either singly or in any combination thereof.

Formation of Gas Barrier Film (A)

In order to obtain a mixture of the poly(meth)acrylic acid polymer and the saccharide, there is used a method in which both components are dissolved in water, a method in which aqueous solutions of the respective components are mixed, a method in which a (meth)acrylic acid monomer is polymerized in an aqueous solution of the saccharide, and the resulting polymer is then neutralized with an alkali if desired, or the like. When the poly(meth)acrylic acid polymer and the saccharide are dissolved in water, an intimate mixture solution can be provided. Besides water, a solvent such as alcohol or a mixed solvent of water and alcohol or the like may be used.

No particular limitation is imposed on the process for forming films from the mixture of these components. However, exemplary film-forming processes include a process (solvent casting) in which an aqueous solution of the mixture is coated on a support such as a glass plate or plastic film by casting or the like, and the mixture is dried to form a film, a process (extrusion) in which a liquid with the mixture dissolved in water in a high concentration is coated on a rotating drum or belt by a method in which the liquid is cast by an extruder in the form of a film through a thin slit while applying a discharge pressure, or the like, and the resulting water-containing film is dried on the rotating drum or belt, and the like. Of these film-forming processes, the solvent casting process is preferred because a dry film excellent in transparency can be obtained with ease.

In the case where the solvent casting process is used, the solids concentration of the solution is generally adjusted to about 1–30 wt. %, preferably 5–30 wt. %. When the aqueous solution or the liquid with the mixture dissolved in water in a high concentration is prepared, solvents other than water, such as alcohol, flexibilizers, and the like may suitably be added if desired. A plasticizer, a heat stabilizer and/or the like may also be incorporated into at least one of the components in advance. No particular limitation is imposed on the thickness of the film, and it may hence be suitably determined as necessary for the end application intended. However, it may be generally of the order of 0.1–500 μm, preferably 0.5–100 μm, more preferably 0.5–50 μm.

The mixing ratio by weight of the poly(meth)acrylic acid polymer to the saccharide is 95:5 to 20:80, preferably 90:10 to 40:60, more preferably 85:15 to 50:50 from the viewpoint of the improvement in oxygen gas barrier property. A film exhibiting excellent gas barrier property even under high-humidity conditions can be obtained by adjusting the mixing ratio within this range.

In order to obtain a film having excellent water resistance and oxygen gas barrier property from a mixture of the poly(meth)acrylic acid polymer and the saccharide, it is necessary to subject the resulting dry film to a heat treatment under specific conditions after the formation of a film from a solution of the mixture. When a film low in oxygen permeability is intended to form, the treating time may be relatively short if the heat-treating temperature is high. However, it takes longer time as the heat-treating temperature becomes low. In order to provide a film practically usable even under high-humidity conditions, it is desirable that the oxygen permeability of the film be 400 ml(STP)/m²·day·atm{Pa} or lower as measured under conditions of film thickness of 3 μm, 30° C. and 80% RH. This oxygen permeability corresponds to an oxygen permeability constant of $5.00 \times 10^{-3}$ ml(STP)·cm/m²·h·atm{Pa} or smaller.

Therefore, the arrangement of the experimental data on the heat-treating temperature, heat-treating time and oxygen permeability has revealed that in order to achieve an oxygen permeability constant not higher than the above by a film formed from a mixture of the poly(meth)acrylic acid polymer and the saccharide, the dry film must be subjected to a heat treatment in a dry heat atmosphere under conditions that the heat-treating temperature and the heat-treating time satisfy the following relationships (1) and (2):

$$\log t \geq -0.0622 \times T + 28.48 \quad (1)$$

$$373 \leq T \leq 623 \quad (2)$$

wherein t means the heat-treating time (min) and T denotes the heat-treating temperature (K). Such a heat treatment makes the dry film insoluble in water and boiling water, thereby imparting water resistance to the resulting gas barrier film.

This heat treatment may be conducted, for example, by placing a film or a laminate of a support and the film for a predetermined period of time into an oven controlled at a predetermined temperature. Alternatively, the heat treatment may be continuously conducted by passing the film or laminate through an oven controlled at the predetermined temperature within the fixed period of time.

In the present invention, to achieve preferable oxygen gas barrier property by which the oxygen permeability is reduced to 100 ml(STP)/m$^2$·day·atm{Pa} or lower as measured under conditions of 30° C. and 80% RH (film thickness: 3 μm), it is only necessary to use heat-treating conditions satisfying the following relationship (3) in place of those satisfying the relationship (1):

$$\log t \geq -0.0631 \times T + 29.32 \quad (3)$$

wherein T satisfies the relationship (2).

The use of the heat-treating conditions satisfying the relationship (3) permits the provision of a water-resistant, gas barrier film having an oxygen permeability constant (at 30° C. and 80% RH) of $1.25 \times 10^{-3}$ ml(STP)·cm/m$^2$·h·atm{Pa} or smaller.

In order to achieve oxygen gas barrier property by which the oxygen permeability is reduced to 10 ml(STP)/m$^2$·day·atm{Pa} or lower as measured under conditions of 30° C. and 80% RH (film thickness: 3 μm), it is only necessary to use heat-treating conditions satisfying the following relationship (4) in place of those satisfying the relationship (1):

$$\log t \geq -0.0645 \times T + 30.71 \quad (4)$$

wherein T satisfies the relationship (2).

The use of the heat-treating conditions satisfying the relationship (4) permits the provision of a water-resistant, gas barrier film having an oxygen permeability constant (at 30° C. and 80% RH) of $1.25 \times 10^{-4}$ ml(STP)·cm/m$^2$·h·atm{Pa} or smaller.

In order to achieve oxygen gas barrier property by which the oxygen permeability is reduced to 1 ml(STP)/m$^2$·day·atm{Pa} or lower as measured under conditions of 30° C. and 80% RH (film thickness: 3 μm), it is only necessary to use heat-treating conditions satisfying the following relationship (5) in place of those satisfying the relationship (1):

$$\log t \geq -0.0659 \times T + 32.11 \quad (5)$$

wherein T satisfies the relationship (2).

The use of the heat-treating conditions satisfying the relationship (5) permits the provision of a water-resistant, gas barrier film having an oxygen permeability constant (at 30° C. and 80% RH) of $1.25 \times 10^{-5}$ ml(STP)·cm/m$^2$·h·atm{Pa} or smaller.

Besides a dry heat atmosphere such as in an oven, a method in which a dry film is brought into contact with, for example, a heated roll or a group of heated rolls, and the like may also be used as heat-treating means.

When a dry film is brought into contact with the heated roll, a heat treatment can be performed efficiently in a shorter period of time compared with the heat treatment in the dry heat atmosphere. When the heat treatment is performed by means of the heated roll, a water-resistant, gas barrier film having an oxygen permeability constant (at 30° C. and 80% RH) of $1.25 \times 10^{-3}$ ml(STP)·cm/m$^2$·h·atm{Pa} or smaller can be obtained by heat-treating the dry film formed from the mixture of the poly(meth)acrylic acid polymer and the saccharide under conditions satisfying the following relationships (a) and (b):

$$\log t \geq -0.0041 \times T + 0.20 \quad (a)$$

$$373 \leq T \leq 623 \quad (b)$$

wherein t means the heat-treating time (min) and T denotes the heat-treating temperature (K).

In order to obtain a water-resistant, gas barrier film having an oxygen permeability constant (at 30° C. and 80% RH) of $1.25 \times 10^{-4}$ ml(STP)·cm/m$^2$·h·atm{Pa} or smaller, it is only necessary to conduct the heat treatment under conditions satisfying the following relationship (c) in place of those satisfying the relationship (a):

$$\log t \geq -0.0344 \times T + 15.9 \quad (c)$$

wherein T satisfies the relationship (b).

In order to obtain a water-resistant, gas barrier film having an oxygen permeability constant (at 30° C. and 80% RH) of $1.25 \times 10^{-5}$ ml(STP)·cm/m$^2$·h·atm{Pa} or smaller, it is only necessary to conduct the heat treatment under conditions satisfying the following relationship (d) in place of those satisfying the relationship (a):

$$\log t \geq -0.0648 \times T + 31.6 \quad (d)$$

wherein T satisfies the relationship (b).

The oxygen permeability constant [ml(STP)·cm/m$^2$·h·atm{Pa}] of a film can be found by multiplying the oxygen permeability [ml(STP)/m$^2$·day·atm{Pa}] of the film as measured under conditions of a film thickness of 3 μm by $1.25 \times 10^{-5}$·cm.

In either heat-treating method, the heat-treating temperature (T) is selected from a range of from 373 K (100° C.) to 623 K (350° C.). However, it takes very long heat-treating time for achieving the desired gas barrier property if the heat-treating temperature falls within a lower temperature range, resulting in reduction of productivity. A film having high gas barrier property can be obtained in shorter heat-treating time as the heat-treating temperature becomes high. However, if the temperature is too high, there is a possibility that discoloration and/or decomposition may occur on the film. Accordingly, the upper limit of the heat-treating temperature (T) is preferably 573 K (300° C.). On the other hand, the lower limit of the heat-treating temperature (T) is preferably 433 K (160° C.).

The lower limit of the heat-treating time at a predetermined heat-treating temperature is preferably determined to a period of time for which a water-resistant, gas barrier film having an oxygen permeability constant (at 30° C. and 80% RH) of $5.00 \times 10^{-3}$ ml(STP)·cm/m$^2$·h·atm{Pa} or smaller can be provided, while the upper limit of the heat-treating time is determined to a range in which neither discoloration nor decomposition occurs on the film.

Heat-treating conditions in the dry heat atmosphere are preferably determined to 433–523 K (160–250° C.) and 4 hours down to 1 minute, more preferably 453–523 K (180–250° C.) and 2 hours down to 1 minute, most preferably 473–523 K (200–250° C.) and 30 down to 1 minute.

Conditions for the heat treatment by the contact with a heating member such as a heated roll are preferably determined to 433–523 K (160–250° C.) and 180 down to 1 second, more preferably 453–523 K (180–250° C.) and 120 down to 3 seconds, most preferably 473–523 K (200–250° C.) and 60 down to 3 seconds.

In either heat-treating conditions, the heat treatment is conducted in long heat-treating time if the heat-treating temperature is low. The heat-treating time is made shorter as the heat-treating temperature is increased. Heat-treating time for which the desired oxygen gas barrier property and water resistance are achieved, and on the other hand, neither discoloration nor decomposition of the film occurs at a predetermined heat-treating temperature is used. From the viewpoint of productivity, it is desirable to use a relatively high heat-treating temperature and relatively short heat-treating time within the above-described range of the heat-treating conditions.

The use of the heat-treating conditions according to the present invention permits the provision of a film exhibiting high oxygen gas barrier property even under high-humidity conditions from a mixture of the poly(meth)acrylic acid polymer and the saccharide. This film is also given good water resistance by the heat treatment and hence insoluble in water and boiling water.

Laminate and Production Process Thereof

The laminates according to the present invention have a laminated structure of at least two layers, in which the above-described gas barrier film (A) is laminated contiguously to a layer (B) formed from a thermoplastic resin.

No particular limitation is imposed on the thermoplastic resin to be used. As examples thereof, may be mentioned polyesters such as polyethylene terephthalate (PET); polyamides such as nylon 6, nylon 66, nylon 12, nylon 6·66 copolymers and nylon 6·12 copolymers; polyolefins such as low-density polyethylene, high-density polyethylene, linear low-density polyethylene, ethylene-vinyl acetate copolymers, polypropylene, ethylene-acrylic acid copolymers, ethylene-acrylic acid salt copolymers and ethylene-ethyl acrylate copolymers; polyvinyl chloride; polyvinylidene chloride; and polyphenylene sulfide.

The lamination of the layer (film, sheet or the like) of these various thermoplastic resins on the gas barrier film (A) can provide a gas barrier laminate combining excellent gas barrier properties with various performance characteristics and functions, for example, high heat resistance, chemical resistance, oil resistance, mechanical strength, sealing property, weathering resistance and moisture resistance, protection of the gas barrier film, and good machinability in secondary processing. For example, when the gas barrier film is laminated on a film formed of a thermoplastic resin having good heat-sealing property, such as a polyolefin, a laminate combining high gas barrier property with good heat-sealing property can be obtained. Besides, when laminated on a heat-resistant film, a laminate to which high heat resistance and toughness, and the like are imparted can be obtained.

The lamination of the gas barrier film (A) with the layer (B) formed from the thermoplastic resin can be performed through an adhesive layer or without need of any adhesive layer by any known laminating process such as a coating process, dry lamination process or extrusion-coating process. In the coating process (including casting process), a mixture solution of the poly(meth)acrylic acid polymer and the saccharide is coated on a layer of the thermoplastic resin to a predetermined thickness by means of, for example, an air-knife coater, kiss-roll coater, metering bar coater, gravure-roll coater, reverse-roll coater, dip coater or die coater, or a combination thereof. Water in the solution thus coated is then evaporated by blowing of heated air, infrared irradiation or the like using an arch dryer, straight bath dryer, tower dryer or drum dryer, or a combination thereof, thereby forming a dry film. Thereafter, the film is heat-treated.

In the dry lamination process, the gas barrier film and a film or sheet formed from the thermoplastic resin are laminated on each other. In the extrusion-coating process, the thermoplastic resin is melt-extruded on the gas barrier film to form a layer.

In view of the fact that the layer of the gas barrier film (A) is generally formed by casting a solution of the mixture on a support by the solvent casting process, drying the solution to form a film and then heat-treating the dry film at a high temperature, and the simple gas barrier film (A) is insufficient in toughness, it is preferable to use a heat-resistant film such as a stretched PET film, stretched nylon film or stretched polypropylene film as a support, and form the gas barrier film (A) on the support by the solvent casting process and the subsequent heat treatment. Among heat-resistant films, heat-resistant films formed from a thermoplastic resin such as PET or nylon 6, the melting point or Vicat softening point of which is at least 180° C., are particularly preferred because they are good in dimensional stability and permit the provision of laminates with the gas barrier film (A) closely bonded to the heat-resistant film. Incidentally, the melting point and Vicat softening point can be measured in accordance with JIS K-7121 and JIS K-7206, respectively.

The laminates according to the present invention are not limited to those having a two-layer structure of the gas barrier film (A) and the thermoplastic resin layer (B), and one or more others layers may hence be laminated. As examples thereof, may be mentioned glass sheets and plastic sheets. Besides, the gas barrier film (A) can be sandwiched between thermoplastic resin layers identical to or different from each other to obtain a laminate improved in dependence of the gas barrier property on humidity, mechanical strength, water resistance and the like. In addition, various films and coating layers may be provided to impart functions such as gloss, fog resistance and ultraviolet barrier property to the laminate.

If a heat-resistant film in the laminate of the gas barrier film and the heat-resistant film is insufficient in sealing property, an additional layer of a thermoplastic resin having good sealing property may be laminated on the laminate to impart the good sealing property to the laminate. Sealing methods of packaging materials generally include heat sealing, impulse heat sealing, high-frequency sealing, ultrasonic sealing and the like. Therefore, the sealing layer may desirably be formed from a thermoplastic resin fit for the sealing method used.

In packaging materials, the heat sealing is generally used. Examples of the sealing layer capable of heat-sealing include layers formed from polyolefins such as low-density polyethylene, linear low-density polyethylene, high-density polyethylene, ethylene-vinyl acetate copolymers, polypropylene, ethylene-acrylic acid copolymers, ethylene-acrylic acid salt copolymers and ethylene-ethyl acrylate copolymers, nylon copolymers such as nylon 6·66 copolymers and nylon 6·12 copolymers, etc.

As the sealing method, the high-frequency sealing may also be often used. Examples of the sealing layer capable of high-frequency-sealing include layers formed from polyvinyl chloride, polyvinylidene chloride, nylon 6 and nylon 66.

The thermoplastic resin having sealing property may be suitably selected as necessary for the end application intended. It is however preferable to use a thermoplastic resin having a melting point or Vicat softening point lower than 180° C. in that a laminate having sealing strength of at least 2 kg·f (15 mm wide) is generally easy to be obtained.

In the case where a sealing layer is additionally laminated on the laminate of the gas barrier film and the heat-resistant film, the sealing layer is laminated contiguously to either the gas barrier film or the heat-resistant film through an adhesive layer or without need of any adhesive layer. A further layer may be laminated on the side not laminated with the sealing layer if desired.

If the adhesion between the individual layers is insufficient, an adhesive layer may be provided therebetween. As adhesives used for it, may be mentioned various kinds of adhesives such as urethane-based, acrylic-based and polyester-based adhesives, which are commonly used for dry lamination and the like of various films.

Various kinds of additives such as an antioxidant, lubricant, ultraviolet absorbent, pigment, filler and antistatic agent may be added to the individual layers according to the present invention if desired.

In the laminates according to the present invention, the thickness of the gas barrier film (A) is as described above. No particular limitation is imposed on the thickness of the layer (B) formed from the thermoplastic resin. However, it is generally 5–1,000 μm, preferably 10–100 μm from the viewpoint of mechanical strength, flexibility, economy and the like. In the case where the layer (B) formed from the thermoplastic resin serves as the sealing layer, or where a sealing layer is provided separately from the layer (B) formed from the thermoplastic resin, no particular limitation is imposed on the thickness of the sealing layer. However, it is generally 5–1,000 μm, preferably 10–100 μm from the viewpoint of sealing strength, flexibility, economy and the like.

The laminated structures of the laminates according to the present invention are as described above. As typical structures thereof, may be mentioned (1) gas barrier film/thermoplastic resin layer, (2) heat-resistant film/gas barrier film/sealing layer and (3) sealing layer/heat-resistant film/gas barrier film. However, the laminates are not limited to these structures only. If desired, an additional layer may be further provided, or a multi-layer laminate containing at least two sets of the gas barrier film/the thermoplastic resin layer may be formed.

The production process of the laminates according to the present invention is as already described. As a particularly preferred embodiment, however, may be mentioned a process for the production of a laminate having a laminated structure of at least two layers, which comprises a step of forming a gas barrier film (A) having an oxygen permeability constant of $5.00 \times 10^{-3}$ ml(STP)·cm/m$^2$·h·atm{Pa} or smaller as measured under conditions of 30° C. and 80% RH, wherein a solution containing a poly(meth)acrylic acid polymer and a saccharide in a weight ratio ranging from 95:5 to 20:80, is coated on a layer (B) formed from a thermoplastic resin, the solution coated is dried to form a film, and the film is then subjected to a heat treatment at a temperature of at least 100° C. (373 K), said film (A) and layer (B) being contiguous to each other.

The heat-treating conditions are as described above. It is also preferable to use the heat-resistant film as the layer (B) formed from the thermoplastic resin for the purpose of rapidly conducting the heat treatment. If the layer (B) formed from the thermoplastic resin is lacking or insufficient in sealing property, a layer having good sealing property may be additionally laminated on the thus-obtained laminate composed of the gas barrier film (A) and the layer (B) formed from the thermoplastic resin, thereby producing a laminate having a three-layer structure. The sealing layer is laminated contiguously to either the gas barrier film (A) or the layer (B) through an adhesive layer or without need of any adhesive layer by the dry lamination process or the like. It goes without saying that one or more other layers may be laminated together with the sealing layer or in place of the sealing layer.

ADVANTAGES OF THE INVENTION

According to the present invention, there are provided gas barrier laminates comprising, as a gas barrier layer, a film having high water resistance and exhibiting excellent oxygen gas barrier property even under high-humidity conditions, and a production process thereof. The gas barrier film useful in the practice of the present invention has excellent gas barrier property and is low in dependence of the gas barrier property on humidity and good in water resistance. The laminates comprising this gas barrier film combine the gas barrier property with good sealing property and high toughness and are hence suitable for use as packaging materials for goods and products liable to be deteriorated by oxygen gas, for example, meat products such as meat, hams and sausages, drinks such as juices and soda pop, medical products such as infusions, etc.

EMBODIMENTS OF THE INVENTION

The present invention will hereinafter be described more specifically by the following referential examples, examples and comparative examples. It should however be borne in mind that the present invention is not limited to these examples only.

REFERENTIAL EXAMPLE 1

In this Referential Example 1, the influence of the mixing ratio of a poly(meth)acrylic acid polymer and a saccharide on the gas barrier property of heat-treated films will be described.

A 25 wt. % aqueous solution of polyacrylic acid (product of Wako Pure Chemical Industries, Ltd., viscosity: 8,000–12,000 cPs at 30° C., number average molecular weight: 150,000) was used as polyacrylic acid (PAA) to prepare a 10 wt. % aqueous solution by diluting with water. Sodium hydroxide in a calculated amount to the number of moles of carboxyl groups in PAA was added to the 10 wt. % aqueous solution of PAA to dissolve it in the solution, thereby preparing an aqueous solution of a partially neutralized product (PAANa) having a degree of neutralization (DN) of 10%. On the other hand, soluble starch (product of Wako Pure Chemical Industries, Ltd., water-soluble starch obtained by hydrolyzing potato starch with an acid) was used as a saccharide to prepare a 10 wt. % aqueous solution thereof.

The above-prepared aqueous PAANa solution and aqueous soluble starch solution were mixed to give such various weight ratios (in terms of solids) as shown in Table 1, thereby preparing aqueous mixture solutions (concentration: 10 wt. %). These aqueous solutions were separately coated by a Meyer bar using a bench coater (K303 PROOFER, manufactured by RK Print-Coat Instruments, Ltd.) on stretched polyethylene terephthalate films (stretched PET films 16 μm thick, melting point: 264° C.), and water was then evaporated by a dryer, thereby obtaining dry films 3 μm thick. The stretched PET films on which these dry films had been separately formed were fixed to a cardboard with an adhesive vinyl tape to subject them to a heat treatment at 200° C. for 15 minutes in an oven. Oxygen permeabilities measured under conditions of 30° C. and 80% RH on the heat-treated films (thickness: 3 μm) thus obtained are shown in Table 1.

Oxygen permeabilities of heat-treated films obtained by singly using PAA, PAANa and the soluble starch, and a film formed of a mixture of PAANa and the soluble starch and subjected to no heat treatment are also shown collectively in Table 1. The results shown in Table 1 are also graphically illustrated in FIG. 1.

<Measurement of oxygen permeability>

The oxygen permeability of each of the coating films was determined by separately measuring oxygen permeabilities of the stretched PET film and a laminate (the stretched PET film on which the film had been formed) by means of an oxygen permeability tester, OX-TRAN 2/20 manufactured by Modern Control Company, and calculating the oxygen permeability, $P_{film}$ of the coating layer (film) in accordance with the following equation:

$$1/P_{total}=1/P_{film}+1/P_{PET}$$

wherein $P_{total}$: oxygen permeability of the stretched PET film on which the film had been formed;

$P_{film}$: oxygen permeability of the film; and $P_{PET}$: oxygen permeability of the stretched PET film.

Table 1

| Composition (wt. %) | | | Heat treatment | | Oxygen permeability (30° C., 80% RH, 3 μm) |
|---|---|---|---|---|---|
| PAA | PAANa | Soluble starch | Temp. (° C.) | Time (min) | ml(STP)/ m² · day · atm{Pa} |
| — | 20 | 80 | 200 | 15 | 380 |
| — | 40 | 60 | 200 | 15 | 7.8 |
| — | 60 | 40 | 200 | 15 | 0.6 |
| — | 70 | 30 | 200 | 15 | 0.2 |
| — | 80 | 20 | 200 | 15 | 0.7 |
| 100 | — | — | 200 | 15 | >5000 |
| — | 100 | — | 200 | 15 | >5000 |
| — | — | 100 | 200 | 15 | >5000 |
| — | 70 | 30 | — | — | >5000 |

As apparent from Table 1, it is understood that films exhibiting excellent gas barrier property even under high-humidity conditions can be obtained in a weight ratio of PAANa:starch ranging from 95:5 to 20:80, preferably from 90:10 to 40:60, more preferably from 85:15 to 50:50. All these heat-treated films were insoluble in boiling water (95° C.) when immersed for 10 minutes therein.

On the other hand, the heat-treated films obtained by singly using PAA, PAANa and soluble starch were very high in oxygen permeability. The film formed from the mixture of PAANa and the soluble starch, and subjected to no heat treatment also exhibited a very high oxygen permeability. All these films were soluble in boiling water.

REFERENTIAL EXAMPLE 2

In this Referential Example 2, the influence of heat-treating conditions (heat-treating temperature and heat-treating time) on the gas barrier property of heat-treated films will be described.

An aqueous solution (concentration: 10 wt. %) containing a partially neutralized product (PAANa, DN=10%) of the polyacrylic acid and the soluble starch in a weight ratio of 70:30 was used to form a coating film on a stretched PET film in the same manner as in Referential Example 1. Portions of the stretched PET film on which the film had been formed were separately subjected to a heat treatment with heat-treating time and heat-treating temperature varied as shown in Table 2. The oxygen permeability of each of the heat-treated films thus obtained was measured under conditions of a film thickness of 3 μm, 30° C. and 80% RH. The results are shown in Table 2. The results shown in Table 2 are also graphically illustrated in FIG. 2.

TABLE 2

| Heat-treating conditions | | Oxygen permeability ml (STP)/m² · day · atm{Pa} |
|---|---|---|
| Temperature | Time | (30° C., 80% RH, 3 μm) |
| 140° C. | 4 hours | 3200 |
|  | 8 hours | 490 |
|  | 16 hours | 320 |
|  | 32 hours | 120 |
| 160° C. | 30 minutes | 350 |
|  | 1 hour | 140 |
|  | 2 hours | 69 |
|  | 4 hours | 35 |
|  | 8 hours | 18 |
| 180° C. | 15 minutes | 27 |
|  | 30 minutes | 4.8 |
|  | 1 hour | 3.4 |
|  | 2 hours | 1.3 |
| 200° C. | 5 minutes | 3.50 |
|  | 15 minutes | 0.22 |
|  | 30 minutes | 0.16 |
|  | 1 hour | 0.09 |

Figure 2:
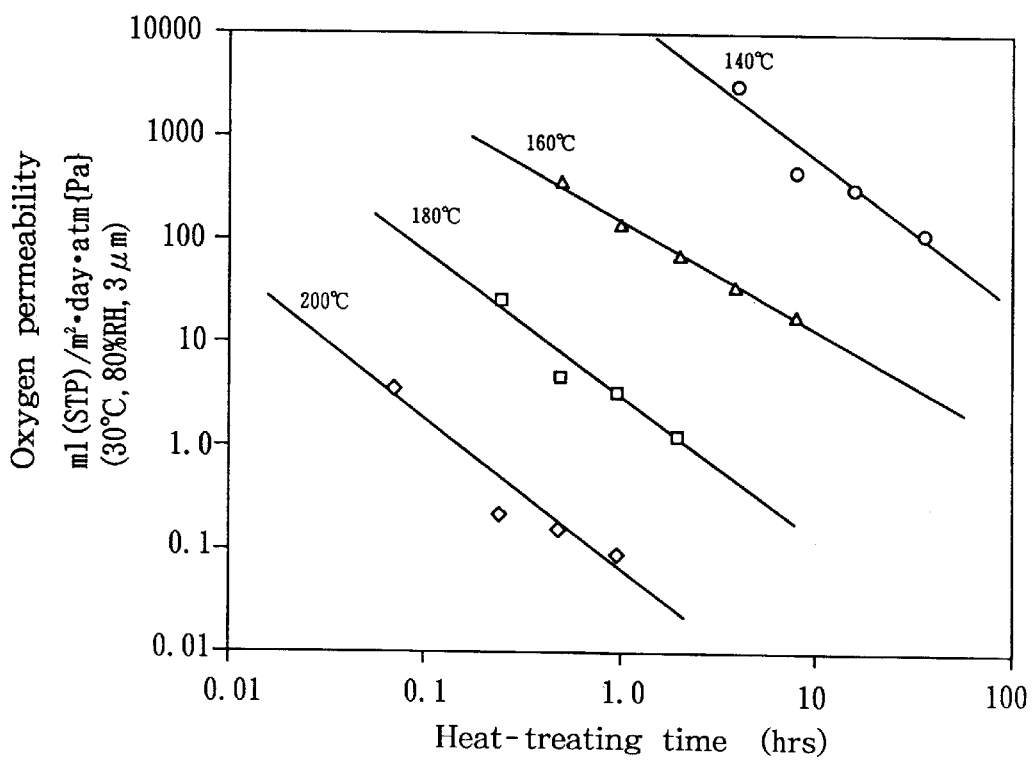
FIG. 2 is a graph showing a relationship among heat-treating temperature, heat-treating time and oxygen permeability as to heat-treated films formed from a mixture of a partially neutralized product of PAA and soluble starch and obtained with the heat-treating temperature varied.

With respect to the relationship between oxygen permeability (P) and heat-treating time (t: min), a linear regression line between log P and log t was prepared in each heat-treating temperature from the data shown in Table 2 in accordance with a method known per se in the art. The results are illustrated in FIG. 2. In each heat-treating temperature, heat-treating time, log t for which the oxygen permeability came to 10, 100 or 400 ml(STP)/ m²·day·atm{Pa} was then calculated out. Further, a linear regression line as to the relationship between the heat-treating temperature (T) and log t was prepared on the basis of this calculated result.

Heat-treating conditions under which the oxygen permeability (at 30° C. and 80% RH) came to 400 ml(STP)/ m²·day·atm{Pa} or lower were found from the results of the regression analysis obtained above. As a result, the following relationship was found:

$$\log t \geq -0.0622 \times T + 28.48 \quad (1)$$

wherein t means the heat-treating time (min), and T denotes the heat-treating temperature (K).

Taking the coloring of the film, the decomposition·melting of the polymer components, etc. into consideration, the range of the heat-treating temperature comes to $373 \leq T \leq 623$.

The use of these heat-treating conditions permits the provision of films improved in gas barrier property as demonstrated by an oxygen permeability constant of $5.00 \times 10^{-3}$ ml(STP)·cm/m²·h·atm{Pa} or smaller as measured under conditions of 30° C. and 80% RH.

REFERENTIAL EXAMPLE 3

In this Referential Example 3, the influence of degree of neutralization of the poly(meth)acrylic acid polymer on the gas barrier property will be described.

Aqueous solutions (concentration: 10 wt. %) containing any one of partially neutralized products (PAANa, DN=0–50%) of the polyacrylic acid, which were different in degree of neutralization, and the soluble starch in a weight ratio of 70:30 were separately used to form coating films on stretched PET films in the same manner as in Referential Example 1. The thus-formed films were heat-treated at 200° C. for 15 minutes. The oxygen permeability of each of the heat-treated films thus obtained was then measured under conditions of a film thickness of 3 μm, 30° C. and 80% RH. The results are shown in Table 3.

TABLE 3

| Degree of neutralization (%) | Oxygen permeability (30° C., 80% RH, 3 μm) ml (STP)/m² · day · atm{Pa} |
|---|---|
| 0 | 25 |
| 10 | 0.2 |
| 20 | 320 |
| 50 | 1560 |

As apparent from the results shown in Table 3, it is understood that the use of the poly(meth)acrylic acid polymer having a degree of neutralization of 20% or lower is preferred from the viewpoint of providing a film excellent in oxygen gas barrier property.

EXAMPLES 1–7 AND COMPARATIVE EXAMPLES 1–2:

A 25 wt. % aqueous solution of polyacrylic acid (product of Wako Pure Chemical Industries, Ltd., viscosity: 8,000–12,000 cPs at 30° C., number average molecular weight: 150,000) was used as polyacrylic acid (PAA). PAA was partially neutralized with sodium hydroxide (NaOH) to a degree of neutralization of 10% to prepare a partially neutralized product (PAANa, DN=10%). Soluble starch (product of Wako Pure Chemical Industries, Ltd., water-soluble starch obtained by hydrolyzing potato starch with an acid) was used as a saccharide to prepare a 10 wt. % aqueous solution thereof.

An aqueous solution (polymer concentration: 10 wt. %) of a mixture containing PAANa and the soluble starch in a weight ratio of 70:30 was then prepared. This aqueous solution was coated by a Meyer bar on a stretched PET film (melting point: 264° C.) or a stretched nylon 6 (ONy) film (melting point: 220° C.), and water was then evaporated by a dryer, thereby obtaining dry films 3 μm thick. The stretched PET film and ONy film on which these dry films had been respectively formed were subjected to a heat treatment in an oven. Besides, an aqueous solution of a mixture containing PAA and the soluble starch in a weight ratio of 70:30 was prepared, and a dry film was formed on a stretched PET film in the same manner as described above, and then subjected to a heat treatment.

Further, a 20 wt. % aqueous solution of polymethacrylic acid (AC-30H, product of NIHON JUNYAKU Co., Ltd., number average molecular weight: 50,000) was used as polymethacrylic acid (PMAA) to prepare a partially neutralized product (PMAANa) having a degree of neutralization of 10% with NaOH. An aqueous solution (polymer concentration: 10 wt. %) of a mixture containing PMAANa and the soluble starch in a weight ratio of 70:30 was then prepared. This aqueous solution was coated by a Meyer bar on an ONy film, and water was then evaporated by a dryer, thereby obtaining a dry film 3 μm thick. The ONy film on which the dry film had been formed was subjected to a heat treatment.

A linear low-density polyethylene (LLDPE) film (melting point: 121° C.) or an unstretched polypropylene (CPP) film (melting point: 165° C.) were separately dry-laminated through a layer of an adhesive (Adcoat 335A, product of Toyo Morton K.K.; hardener: CAT-10) on some of the thus-obtained laminates having a two-layer structure. The thickness of the adhesive layer was 3 μm. For the sake of comparison, the aqueous solution of the mixture of PAANa and the soluble starch was cast on a glass plate to form a dry film. The dry film was then subjected to a heat treatment and then peeled from the glass plate, thereby producing a simple heat-treated film.

The laminated structures, heat-treating conditions, oxygen permeabilities measured under conditions of 30° C. and 80% RH, oxygen permeabilities after a Gerbo test and sealing strength of the laminates thus obtained are shown in Table 4.

<Sealing strength>

Each sample was heat-sealed by means of a deaerating sealer, V-300 (manufactured by Fuji Impulse K.K.). A sealing surface was formed by the third layer (Examples 1–3 and 6–7) or the first layer (Examples 4–5 and Comparative Examples 1–2). The sealing strength was determined by measuring the tensile strength of a piece of film cut out into a width of 15 mm by means of a Tensilon RTM100 manufactured by Toyo Baldwin K.K. The pulling rate was 500 mm/min.

<Resistance to flexural fatigue: oxygen permeability after Gerbo test>

A sample piece was flexed 10 times at 25° C. and 50% RH by means of a Gerbo flex tester manufactured by Rigaku Kogyo K.K., and its oxygen permeability was then measured.

TABLE 4

| | Laminated structure | | | Heat treatment | | Oxygen permeability[*1] | | Sealing[*2] |
|---|---|---|---|---|---|---|---|---|
| | First layer (μm) | Second layer (μm) | Third layer (μm) | Temp. (°C.) | Time (min) | Laminated film | After Gerbo test | strength |
| Ex. 1 | PET (12) | PAANa + Starch (3) | LLDPE (50) | 200 | 15 | 0.2 | 1.0 | 4.3 |
| Ex. 2 | PET (12) | PAANa + Starch (3) | CPP (50) | 200 | 15 | 0.2 | 1.0 | 3.0 |
| Ex. 3 | ONy (12) | PAANa + Starch (3) | LLDPE (50) | 200 | 15 | 0.2 | 1.0 | 4.3 |
| Ex. 4 | ONy (12) | PAANa + Starch (3) | — | 200 | 15 | 0.2 | 1.5 | 0.6 |
| Ex. 5 | ONy (15) | PMAANa + Starch (3) | — | 200 | 15 | 42 | 68 | 0.7 |
| Ex. 6 | PAANa + Starch (3) | PET (12) | CPP (50) | 200 | 15 | 0.2 | 1.5 | 3.0 |

TABLE 4-continued

| | Laminated structure | | | Heat treatment | | Oxygen permeability[*1] | | Sealing[*2] strength |
|---|---|---|---|---|---|---|---|---|
| | First layer (μm) | Second layer (μm) | Third layer (μm) | Temp. (°C.) | Time (min) | Laminated film | After Gerbo test | |
| Ex. 7 | PET (12) | PAA + Starch (3) | LLDPE (50) | 200 | 15 | 20 | 25 | 4.3 |
| Comp. Ex. 1 | PET (12) | — | — | Subjected to no heat treatment | | 140 | 140 | 0.7 |
| Comp. Ex. 2 | PAANa + Starch (30) | — | — | 200 | 15 | 0.2 | Broken | 0 |

[*1]Unit: ml(STP)/m$^2$ · day · atm{Pa};
[*2]Unit: kg · f (15 mm wide).

The laminated films according to the present invention, in which PET, ONy, CPP and/or LLDPE were laminated on one side or both sides of the gas barrier film, had high oxygen gas barrier property even after the Gerbo test in which a sample was flexed 10 times. The laminated films, particularly, the polyolefin-laminated films (Examples 1–3 and 6–7) were good in heat-sealing property and hence had performance suitable for packaging films. On the contrary, when the layer of the gas barrier film was heat-sealed, sealing was unsuccessful. In addition, this simple layer of the gas barrier film (Comparative Example 2) was fragile and hence broken by the Gerbo test.

EXAMPLES 8–39

A 25 wt. % aqueous solution of polyacrylic acid (product of Wako Pure Chemical Industries, Ltd., viscosity: 8,000–12,000 cPs at 30° C., number average molecular weight: 150,000) was used as PAA. PAA was partially neutralized with sodium hydroxide (NaOH) to a degree of neutralization of 10% to prepare PAANa (DN=10%). On the other hand, the following monosaccharides, sugar alcohols and polysaccharides were separately used as a saccharide to prepare 10 wt. % aqueous solutions thereof. With respect to sodium alginate, agarose, pectin (made from apple) and sodium carboxymethylcellulose, however, 2 wt. % aqueous solutions were prepared because 10 wt. % aqueous solutions thereof were too high in viscosity.

(1) Monosaccharides:
  glucose and galactose (products of Wako Pure Chemical Industries, Ltd.);
(2) Sugar Alcohols:
  sorbitol, maltitol, glycerol and erythritol (products of Wako Pure Chemical Industries, Ltd.); and
(3) Polysaccharides:
  pullulan, chitosan (water soluble), sodium alginate, dextran [number average molecular weight (Mw): 60,000–90,000], agarose (for electrophoresis), pectin (made from apple), sodium carboxymethylcellulose (CMCNa) and poly-β-cyclodextrin (polyβ-CD) (all, products of Wako Pure Chemical Industries, Ltd.); galactan (product of Aldrich Chemical Company Inc.); and amyropectin (product of Fluka Chemie AG).

Aqueous solutions (all, polymer concentration: 10 wt. % except that 2 wt. % aqueous solutions were prepared as to sodium alginate, agarose, pectin and sodium carboxymethylcellulose) of mixtures containing PAANa and the individual saccharides in a weight ratio of 70:30 were then prepared. These aqueous solutions were separately coated by a Meyer bar on stretched PET films (thickness of 12 μm; melting point: 264° C.) or stretched nylon 6 (ONy) films (thickness of 12 μm; melting point: 220° C.), and water was then evaporated by a dryer, thereby obtaining dry films 3 μm thick. The stretched PET films and stretched nylon 6 films on which these dry films had been respectively formed were subjected to a heat treatment for 15 minutes at 200° C. in an oven. All these films (heat-treated films) after the heat treatment were insoluble in boiling water (95° C.) when immersed for 10 minutes therein.

A linear low-density polyethylene (LLDPE) film (melting point: 121° C.) having a thickness of 50 μm was dry-laminated through an adhesive (Adcoat AD335A, product of Toyo Morton K.K.; hardener: CAT-10) on the surfaces of the heat-treated films of the thus-obtained laminates having a two-layer structure of the heat-treated film/the stretched PET film. The thickness of the adhesive layer was 3 μm. Oxygen permeabilities (at 30° C. and 80% RH), oxygen permeabilities (at 30° C. and 80% RH) after a Gerbo test and sealing strength of the laminates thus obtained were measured. These measurements are shown in Table 5 together with the laminated structures of the laminates.

Similarly, an unstretched polypropylene (CPP) film (melting point: 165° C.) having a thickness of 50 μm was dry-laminated through an adhesive (Adcoat AD335A, product of Toyo Morton K.K.; hardener: CAT-10) on the surfaces of the heat-treated films of the thus-obtained laminates having a two-layer structure of the heat-treated film/the stretched nylon 6 film. The thickness of the adhesive layer was 3 μm. Oxygen permeabilities (at 30° C. and 80% RH), oxygen permeabilities (at 30° C. and 80% RH) after a Gerbo test and sealing strength of the laminates thus obtained were measured. These measurements are shown in Table 6 together with the laminated structures of the laminates.

TABLE 5

| | Laminated structure | | | Oxygen permeability[*1] | | Sealing[*2] strength |
|---|---|---|---|---|---|---|
| | First layer (μm) | Second layer (μm) | Third layer (μm) | Laminated film | After Gerbo test | |
| Ex. 8 | PET (12) | Pullulan + PAANa (3) | LLDPE (50) | 2.6 | 3.2 | 4.3 |
| Ex. 9 | PET (12) | Chitosan + PAANa (3) | LLDPE (50) | 2.6 | 3.1 | 4.3 |

TABLE 5-continued

|  | Laminated structure | | | Oxygen permeability(*1) | | Sealing(*2) strength |
|---|---|---|---|---|---|---|
|  | First layer (μm) | Second layer (μm) | Third layer (μm) | Laminated film | After Gerbo test |  |
| Ex. 10 | PET (12) | Sodium alginate + PAANa (3) | LLDPE (50) | 50 | 55 | 4.3 |
| Ex. 11 | PET (12) | Dextran + PAANa (3) | LLDPE (50) | 5.3 | 6.2 | 4.3 |
| Ex. 12 | PET (12) | Agarose + PAANa (3) | LLDPE (50) | 64 | 70 | 4.3 |
| Ex. 13 | PET (12) | Pectin + PAANa (3) | LLDPE (50) | 10 | 13 | 4.3 |
| Ex. 14 | PET (12) | CMCNa + PAANa (3) | LLDPE (50) | 7.4 | 8.2 | 4.3 |
| Ex. 15 | PET (12) | Galactan + PAANa (3) | LLDPE (50) | 33 | 37 | 4.3 |
| Ex. 16 | PET (12) | Amytropectin + PAANa (3) | LLDPE (50) | 2.4 | 2.9 | 4.3 |
| Ex. 17 | PET (12) | Polyβ-CD + PAANa (3) | LLDPE (50) | 2.3 | 2.9 | 4.3 |
| Ex. 18 | PET (12) | Glucose + PAANa (3) | LLDPE (50) | 42 | 48 | 4.3 |
| Ex. 19 | PET (12) | Galactose + PAANa (3) | LLDPE (50) | 25 | 30 | 4.3 |
| Ex. 20 | PET (12) | Sorbitol + PAANa (3) | LLDPE (56) | 4.7 | 5.2 | 4.3 |
| Ex. 21 | PET (12) | Maltitol + PAANa (3) | LLDPE (50) | 1.6 | 2.0 | 4.3 |
| Ex. 22 | PET (12) | Glycerol + PAANa (3) | LLDPE (50) | 26 | 30 | 4.3 |
| Ex. 23 | PET (12) | Erythritol + PAANa (3) | LLDPE (50) | 6.0 | 6.5 | 4.3 |

(*1)Unit: ml(STP)/m$^2$ · day · atm{Pa};
(*2)Unit: kg · f (15 mm wide).

TABLE 6

|  | Laminated structure | | | Oxygen permeability(*1) | | Sealing(*2) strength |
|---|---|---|---|---|---|---|
|  | First layer (μm) | Second layer (μm) | Third layer (μm) | Laminated film | After Gerbo test |  |
| Ex. 24 | ONy (12) | Pullulan + PAANa (3) | CPP (50) | 2.5 | 3.0 | 3.0 |
| Ex. 25 | ONy (12) | Chitosan + PAANa (3) | CPP (50) | 2.5 | 3.0 | 3.0 |
| Ex. 26 | ONy (12) | Sodium alginate + PAANa (3) | CPP (50) | 44 | 48 | 3.0 |
| Ex. 27 | ONy (12) | Dextran + PAANa (3) | CPP (50) | 5.2 | 5.8 | 3.0 |
| Ex. 28 | ONy (12) | Agarose + PAANa (3) | CPP (50) | 55 | 60 | 3.0 |
| Ex. 29 | ONy (12) | Pectin + PAANa (3) | CPP (50) | 9.9 | 11 | 3.0 |
| Ex. 30 | ONy (12) | CMCNa + PAANa (3) | CPP (50) | 7.2 | 7.8 | 3.0 |
| Ex. 31 | ONy (12) | Galactan + PAANa (3) | CPP (50) | 31 | 33 | 3.0 |
| Ex. 32 | ONy (12) | Amyropectin + PAANa (3) | CPP (50) | 2.3 | 2.8 | 3.0 |
| Ex. 33 | ONy (12) | Polyβ-CD + PAANa (3) | CPP (50) | 2.2 | 2.8 | 3.0 |
| Ex. 34 | ONy (12) | Glucose + PAANa (3) | CPP (50) | 37 | 40 | 3.0 |
| Ex. 35 | ONy (12) | Galactose + PAANa (3) | CPP (50) | 23 | 25 | 3.0 |
| Ex. 36 | ONy (12) | Sorbitol + PAANa (3) | CPP (50) | 4.7 | 5.2 | 3.0 |
| Ex. 37 | ONy (12) | Maltitol + PAANa (3) | CPP (50) | 1.6 | 2.0 | 3.0 |
| Ex. 38 | ONy (12) | Glycerol + PAANa (3) | CPP (50) | 24 | 28 | 3.0 |
| Ex. 39 | ONy (12) | Erythritol + PAANa (3) | CPP (50) | 5.9 | 6.5 | 3.0 |

(*1)Unit: ml(STP)/m$^2$ · day · atm{Pa};
(*2)Unit: kg · f (15 mm wide).

EXAMPLE 40

A 25 wt. % aqueous solution of polyacrylic acid (product of Wako Pure Chemical Industries, Ltd., viscosity: 8,000–12,000 cPs at 30° C., number average molecular weight: 150,000) was used as polyacrylic acid (PAA). PAA was partially neutralized with sodium hydroxide (NaOH) to a degree of neutralization of 10% to prepare a partially neutralized product (PAANa, DN=10%). Soluble starch (product of Wako Pure Chemical Industries, Ltd., water-soluble starch obtained by hydrolyzing potato starch with an acid) was used as a saccharide to prepare a 10 wt. % aqueous solution thereof.

An aqueous solution (polymer concentration: 10 wt. %) of a mixture containing PAANa and the soluble starch in a weight ratio of 70:30 was then prepared. This aqueous solution was coated by a Meyer bar on a stretched PET film (melting point: 264° C.) having a thickness of 12 μm, and water was then evaporated by a dryer, thereby obtaining a dry films 3 μm thick. The stretched PET film on which the dry film had been formed was heat-treated by bringing it into contact with a heated roll having the surface temperature of 230° C. for 37 seconds. The film (heat-treated film) after the heat treatment was insoluble in boiling water (95° C.) when immersed for 10 minutes therein.

A linear low-density polyethylene (LLDPE) film (melting point: 121° C.) having a thickness of 50 μm was dry-laminated through a layer of an adhesive (Adcoat 335A, product of Toyo Morton K.K.; hardener: CAT-10) on the surface of the heat-treated film of the thus-obtained laminate having a two-layer structure. The thickness of the adhesive layer was 3 μm.

The laminate thus obtained had an oxygen permeability (at 30° C. and 80% RH) of 0.2 ml(STP)/m$^2$·day·atm{Pa}, an oxygen permeability (at 30° C. and 80% RH) after the Gerbo test of 1.0 ml(STP)/m$^2$·day·atm{Pa} and sealing strength of 4.4 kg·f (15 mm wide).

We claim:

1. A laminate having a laminated structure of at least two layers, which comprises a layer (B) formed of a thermoplastic resin and a gas barrier film (A) which is formed by coating the thermoplastic resin laver (B) with a solution containing at least one poly(meth)acrylic acid polymer selected from the group consisting of poly(meth)acrylic acid and partially neutralized products of poly(meth)acrylic acid and a saccharide in a weight ratio ranging from 95:5 to 20:80, drying the solution to form a film and then heat-treating the film at a temperature of at least 100° C. (373 K), has an oxygen permeability constant of $5.00 \times 10^{-3}$ ml(STP)·cm/m²·h·atm{Pa} or smaller as measured under conditions of 30° C. and 80% relative humidity and is insoluble in boiling water.

2. The laminate as claimed in claim 1, wherein the gas barrier film (A) has an oxygen permeability constant of $1.25 \times 10^{-3}$ ml(STP)·cm/m²·h·atm{Pa} or smaller as measured under conditions of 30° C. and 80% relative humidity.

3. The laminate as claimed in claim 1, wherein the gas barrier film (A) has an oxygen permeability constant of $1.25 \times 10^{-4}$ ml(STP)·cm/m²·h·atm{Pa} or smaller as measured under conditions of 30° C. and 80% relative humidity.

4. The laminate as claimed in claim 1, wherein the gas barrier film (A) has an oxygen permeability constant of $1.25 \times 10^{-5}$ ml(STP)·cm/m²·h·atm{Pa} or smaller as measured under conditions of 30° C. and 80% relative humidity.

5. The laminate as claimed in claim 1, wherein the poly(meth)acrylic acid is polyacrylic acid, polymethacrylic acid, a copolymer of acrylic acid and methacrylic acid, or a mixture of at least two polymers thereof, and has a number average molecular weight ranging from 2,000 to 250,000.

6. The laminate as claimed in claim 1, wherein the partially neutralized product of poly(meth)acrylic acid is obtained by partially neutralizing carboxyl groups of the poly(meth)acrylic acid with an alkali.

7. The laminate as claimed in claim 1, wherein the partially neutralized product of poly(meth)acrylic acid has a degree of neutralization not higher than 20%, said degree of neutralization being a value determined by the following equation:

Degree of neutralization=(X/Y)×100     [%]

wherein X means the number of moles of carboxyl groups neutralized in 1 g of the partially neutralized poly(meth)acrylic acid, and Y denotes the number of moles of carboxyl groups in 1 g of the poly(meth)acrylic acid before the partial neutralization.

8. The laminate as claimed in claim 1, wherein the saccharide is at least one selected from the group consisting of monosaccharides, sugar alcohols, oligosaccharides and polysaccharides.

9. The laminate as claimed in claim 1, wherein the saccharide is soluble in water.

10. The laminate as claimed in claim 8, wherein the polysaccharide is starch.

11. The laminate as claimed in claim 10, wherein the starch is modified starch soluble in water.

12. The laminate as claimed in claim 1, wherein the gas barrier film (A) is a film formed from a mixture containing the poly(meth)acrylic acid polymer and the saccharide in a weight ratio ranging from 90:10 to 40:60.

13. The laminate as claimed in claim 1, wherein the gas barrier film (A) is a film formed from a mixture containing the poly(meth)acrylic acid polymer and the saccharide in a weight ratio ranging from 85:15 to 50:50.

14. The laminate as claimed in claim 1, wherein the layer (B) formed from the thermoplastic resin is a heat-resistant film formed from a thermoplastic resin having a melting point or Vicat softening point of at least 180° C.

15. The laminate as claimed in claim 14, wherein a sealing layer (C) formed from a thermoplastic resin having a melting point or Vicat softening point lower than 180° C. is additionally laminated contiguously to either the gas barrier film (A) or the heat-resistant film (B).

16. The laminate as claimed in claim 15, which has a laminated structure of the heat-resistant film (B)/the gas barrier film (A)/the sealing layer (C).

17. A process for the production of a laminate having a laminated structure of at least two layers, which comprises a step of forming a gas barrier film (A) having an oxygen permeability constant of $5.00 \times 10^{-3}$ ml(STP)·cm/m²·h·atm (Pa) or smaller as measured under conditions of 30° C. and 80% relative humidity, wherein a solution containing at least one poly(meth)acrylic acid polymer selected from the group consisting of poly(meth)acrylic acid and partially neutralized products of poly(meth)acrylic acid and a saccharide in a weight ratio ranging from 95:5 to 20:80 is coated on a layer (B) formed from a thermoplastic resin, the solution coated is dried to form a film, and the film is then subjected to a heat treatment at a temperature of at least 100° C. (373 K), said film (A) and layer (B) being contiguous to each other.

18. The process as claimed in claim 17, wherein the heat treatment is conducted in a dry heat atmosphere under conditions that the heat-treating temperature and the heat-treating time satisfy the following relationships (1) and (2):

$$\log t \geq -0.0622 \times T + 28.48 \quad (1)$$

$$373 \leq T \leq 623 \quad (2)$$

wherein t means the heat-treating time (min), and T denotes the heat-treating temperature (K).

19. The process as claimed in claim 18, wherein the heat treatment is conducted for 1–30 minutes at 473–523 K (200–250° C.).

20. The process as claimed in claim 17, wherein the heat treatment is conducted by bringing the dry film into contact with a heated roll under conditions that the heat-treating temperature and the heat-treating time satisfy the following relationships (a) an d (b):

$$\log t \geq -0.0041 \times T + 0.20 \quad (a)$$

$$373 \leq T \leq 623 \quad (b)$$

where in T means the heat-treating time (min), and T denotes the heat-treating temperature (K).

21. The process as claimed in claim 20, wherein the heat treatment is conducted for 3–60 seconds at 473–523 K (200–250° C.).

22. The process as claimed in claim 17, wherein the poly(meth)acrylic acid is polyacrylic acid, polymethacrylic acid, a copolymer of acrylic acid and methacrylic acid, or a mixture of at least two polymers thereof, and has a number average molecular weight ranging from 2,000 to 250,000.

23. The process as claimed in claim 17, wherein the partially neutralized product of poly(meth)acrylic acid is obtained by partially neutralizing carboxyl groups of the poly(meth) acrylic acid with an alkali and has a degree of neutralization not higher than 20%, said degree of neutralization being a value determined by the following equation:

Degree of neutralization=(X/Y)×100 wherein X means the number of moles of carboxyl groups neutralized in 1 g of the partially neutralized poly(meth)acrylic acid, and Y denotes the number of moles of carboxyl groups in 1 g of the poly(meth)acrylic acid before the partial neutralization.

24. The process as claimed in claim 17, wherein the saccharide is at least one selected from the group consisting of monosaccharaides, sugar alcohols, oligosaccharides and polysaccharides.

25. The process as claimed in claim 24, wherein the polysaccharide is starch.

26. The process as claimed in claim 17, wherein the layer (B) formed from the thermoplastic resin is a heat-resistant film formed from a thermoplastic resin having a melting point or Vicat softening point of at least 180° C.

27. The process as claimed in claim 26, which comprises a step of further laminating a sealing layer (C) formed from a thermoplastic resin having a melting point or Vicat softening point lower than 180° C. contiguously to either the gas barrier film (A) or the heat-resistant film (B).

28. The process as claimed in claim 27, wherein the sealing layer (C) is laminated on the surface of the gas barrier film (A) of the laminated film formed of the heat-resistant film (B) and the gas barrier film (A) through an adhesive layer.

* * * * *